United States Patent
Sheridan

(10) Patent No.: US 9,937,776 B2
(45) Date of Patent: Apr. 10, 2018

(54) REMOVABLE AERODYNAMIC TRUCK TOPPER

(71) Applicant: Matthew Sheridan, Midland, MI (US)

(72) Inventor: Matthew Sheridan, Midland, MI (US)

(\*) Notice: Subject to any disclaimer, the term of this patent is extended or adjusted under 35 U.S.C. 154(b) by 57 days.

(21) Appl. No.: 15/238,749

(22) Filed: Aug. 17, 2016

(65) Prior Publication Data

US 2018/0050581 A1    Feb. 22, 2018

(51) Int. Cl.
*B60J 7/00* (2006.01)
*B60J 7/14* (2006.01)
*B62D 35/00* (2006.01)

(52) U.S. Cl.
CPC ............. *B60J 7/141* (2013.01); *B62D 35/00* (2013.01)

(58) Field of Classification Search
CPC ............. B60P 7/02; B62D 35/00; B60J 7/104
USPC .................................................. 296/100.18
See application file for complete search history.

(56) References Cited

U.S. PATENT DOCUMENTS

| | | | | |
|---|---|---|---|---|
| 4,496,184 A | * | 1/1985 | Byrd | B60P 7/02 135/88.09 |
| 4,877,283 A | * | 10/1989 | Little | B60J 7/104 296/10 |
| 6,149,217 A | | 11/2000 | Plamondon | |
| 7,954,681 B2 | | 6/2011 | Berg | |
| 8,408,626 B1 | * | 4/2013 | Herndon | B60R 5/042 296/180.1 |
| D723,450 S | * | 3/2015 | Holubar | D12/401 |
| 9,038,531 B1 | * | 5/2015 | Parshall | B60P 7/02 100/5 |
| 2009/0102227 A1 | * | 4/2009 | Herndon | B62D 35/001 296/100.06 |
| 2009/0256382 A1 | * | 10/2009 | Stum | B60J 7/1621 296/100.07 |
| 2010/0045069 A1 | * | 2/2010 | Koba | B60J 7/1621 296/180.1 |
| 2012/0292939 A1 | * | 11/2012 | Daylong | B60J 5/0473 296/37.6 |
| 2016/0229274 A1 | * | 8/2016 | Cote | B60J 7/026 |
| 2017/0210430 A1 | * | 7/2017 | Erlandson | B60J 7/102 |

\* cited by examiner

*Primary Examiner* — Pinel E Romain

(57) ABSTRACT

Removable aerodynamic truck toppers. The truck toppers comprise a frame configured to surmount the top rails of a bed of pickup truck wherein the frame is covered with a fabric cover.

4 Claims, 3 Drawing Sheets

REMOVABLE AERODYNAMIC TRUCK TOPPER

BACKGROUND OF THE INVENTION

Apparati for use in covering open portions of a vehicle are known. They range in style from the earlier retractable enclosure of a convertible to canvas covers that are strapped or tied down to the vehicle.

One such cover is disclosed by Little, et al. in U.S. Pat. No. 4,877,283 that issued on Oct. 31, 1989 in which there is shown a flexible cover and system for enclosing automobile hatches that has an immovable roof structure over the passenger. This device consists of a flexible cover that is fastened into place around the perimeter of the opening that covers the opening. There are no raised bars that would contribute to an aerodynamic configuration.

U.S. Pat. No. 6,149,217 that issued on Nov. 21, 2000 to Plamondon deals with a collapsible truck bed topper. This device has a fabric topper, but is not aerodynamically designed.

U.S. Pat. No. 7,954,881 that issued to Berg on Jun. 7, 2011 deals with an apparatus for a pickup truck box cover. This device has a top portion that is configured to extend back from a top portion of the cab of the pickup truck along a sloping plane intersecting a plane containing the bed of the pickup truck.

THE INVENTION

Thus, the instant invention deals with removable aerodynamic truck toppers. The truck toppers comprise a frame configured to surmount the top rails of a bed of & pickup truck, wherein the frame comprises a front rail having a first end and a second end; two, spaced-apart side rails, one each side rail fixedly attached to a first end of said front rail and said second end of said front rail; two, spaced-apart, elevated side rails, each said elevated side rail having a first end and a second end, each said elevated rail first end being fixedly attached to each said second end of said spaced-apart side rail, each said second end of said elevated side rail being fixedly attached to an enclosure; said enclosures comprised of (i) two spaced-apart panels, said panels being attached to each other by (ii) an extended top bar, (iii) a top having a back edge, there being a partially rolled open conduit attached to said back edge of said top, each said side panel having a partially rolled open conduit attached to a back edge thereof, wherein a bottom edge of each side panel is fixedly attached to each said side rail, there being two, spaced-apart support rods extending between said top bar and said front rail; a removable back bar having two ends, said back bar containing an insertable block at each said end thereof; at least two support tubes that have open ends, said support tubes extending from said top bar to said back bar, said support tubes being removable; each said side rail and said back rail having a plurality of first snap fasteners on an outside surface; said frame being covered with a fabric cover, said fabric cover having a plurality of second snap fasteners, said second snap fasteners aligning with said first snap fasteners.

DETAILED DESCRIPTION OF THE DRAWINGS

Figure 1:
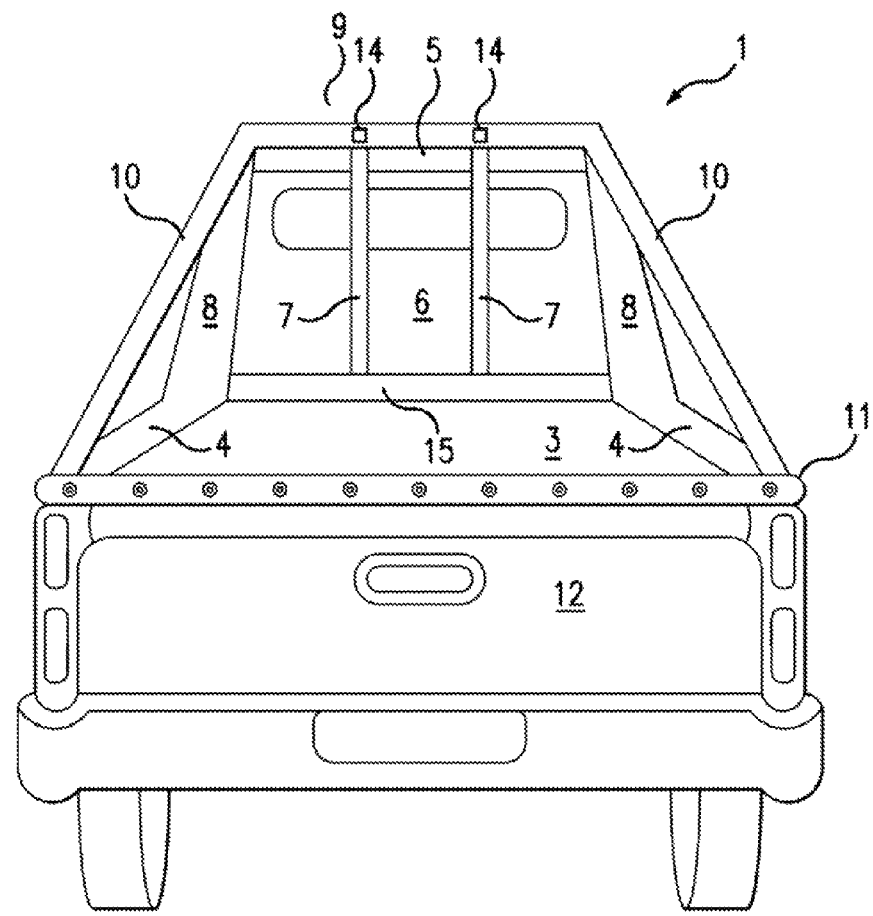
FIG. 1 is a full back view of a device of this invention without the top support rods and the fabric cover.

Turning now to FIG. 1, there is shown a full back view of a device 1 of this invention without the two outside top support tubes 13 and the fabric cover 17.

Shown are the bed of the truck 3 (not part of this invention), the side rails 4, the front bottom rail 15, the front top rail 5, the covering over the front 6, support bars 7, enclosure side wall 8, enclosure top 9, elevated side rails 10, the back bottom rail 11, tailgate 12 of the truck (not part of this invention), support posts 14 for too support rails 13.

Figure 2:
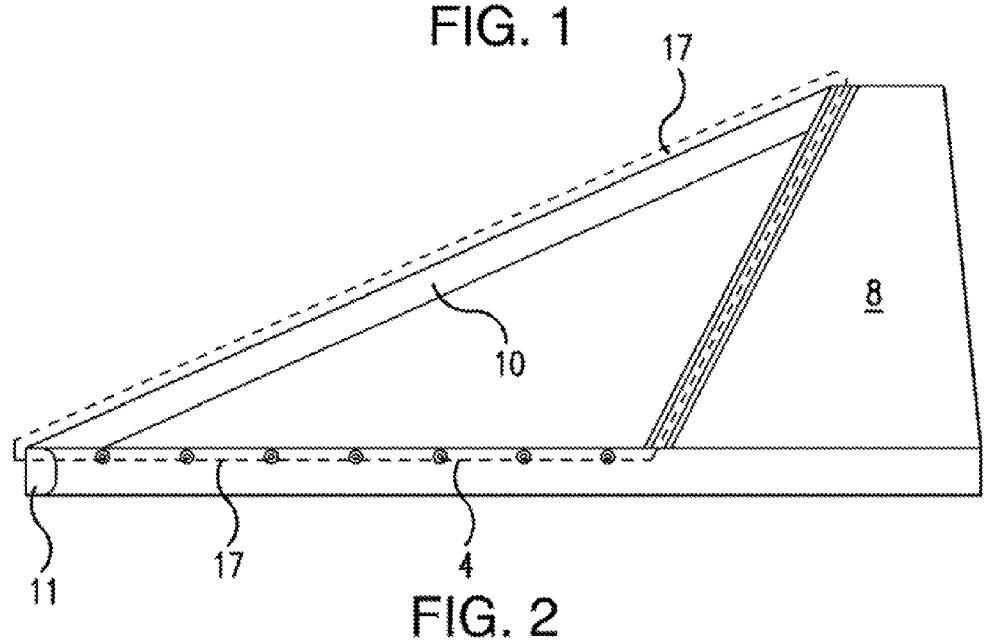
FIG. 2 is a full side view of a device of this invention.

FIG. 2 is a full side of the device 1 of this invention showing the enclosure side wall 8, the lower side rails 4, the back bar bottom rail 11, the elevated side rail 10 and in phantom, the fabric cover 17.

Figure 4:
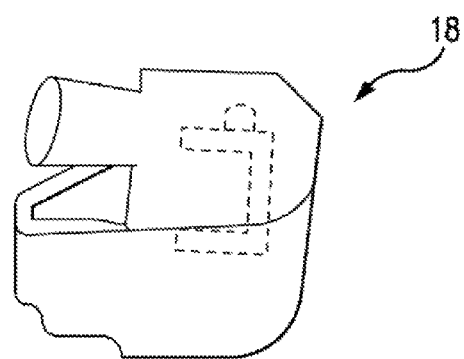
FIG. 4 is an enlarged end of the back rail showing the configuration of the insertable component.
Figure 5:
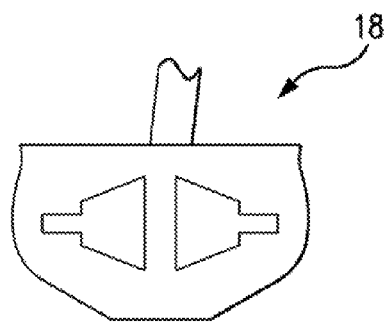
FIG. 5 is a full top view of the component of FIG. 4.

Turning to FIGS. 4 and 5, there is shown an end piece 18 that is affixed to a back bottom rail 11. The bar 11 can be manufactured from suitable plastic or metal, such as aluminum. Suitable plastics include polyethylene, polypropylene, and the like.

Figure 3:
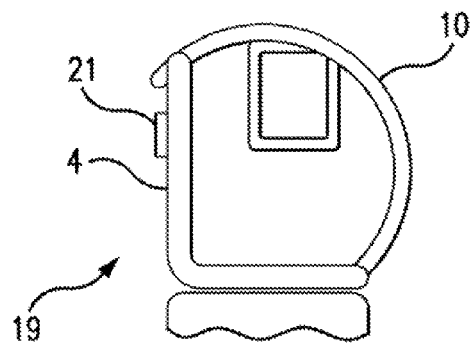
FIG. 3 is a full end view of an elevated side rail showing the configuration of the inside of the elevated side rail for insertion of the back rail.
Figure 9:
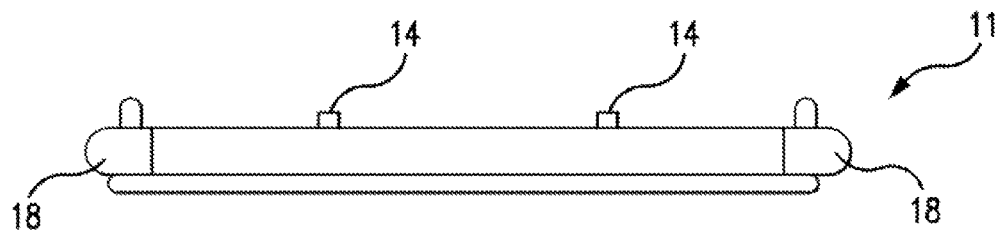
FIG. 9 is a full top view of the back bar of the device.

The end pieces 18 are manufactured from plastic and are located at each end of the back rail 11 and are inserted into the tail end 19 (FIG. 3) of the elevated side rail 10. The rail 11 has fasteners 21 along the outside surface of 19 that allow for the tail end of the fabric cover 17 to be fastened to the rail 11. FIGS. 4 and 5 illustrate the end pieces 18 and FIG. 3 is an end view of the point of insertion 19 on the back of the frame. This insertion is a friction fit. FIG. 9 is a full top view of the back rail 11 showing the end pieces 18, and two support rods 14 for the opposite end of the support tubes 13.

Figure 7:
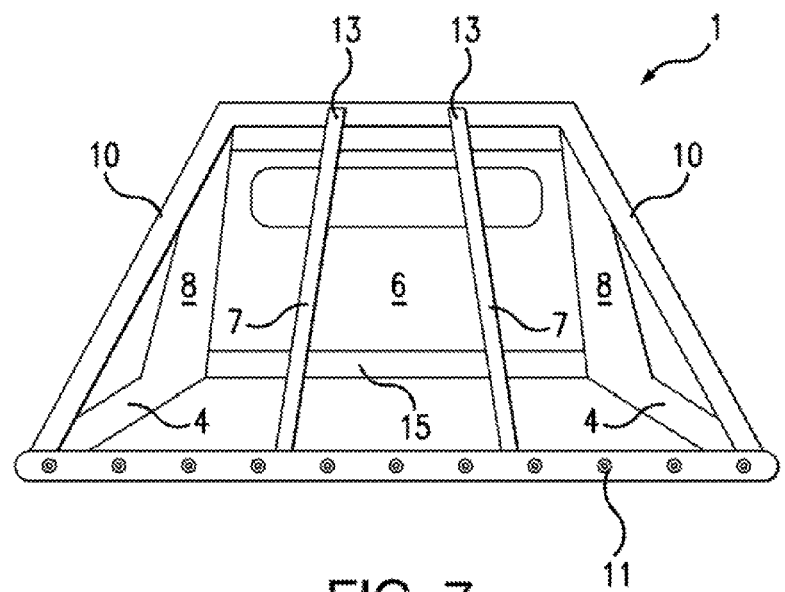
FIG. 7 is a view from the back showing the device.

FIG. 1 shows the support posts 14 for the support tubes 13 which support posts 14 are firmly attached to the back side of the enclosure top. FIG. 7 is a view in perspective of the back of the device 1 without the fabric cover, to show the support tubes 13. The support tubes 13 are hollow and the support posts 14 just insert into the ends of the support tubes 13.

The enclosure is comprised of two spaced-apart panels 8 that are attached to each other by an extended top bar 5. The top 9 of the enclosure has a back edge 22 and there is a partially rolled open conduit 23 attached to the back edge 22. This partially rolled open conduit 23 is used to secure the leading edge of the fabric 17. This is accomplished by fixing a cord in the leading edge of the fabric 17, sewing it into place, and then inserting the cord with the fabric 17 attached, into the conduit. The leading edges of the fabric that are situated on the panels 8 are treated in the same manner in order to fully attach the fabric 17 to the enclosure.

The front of the device is supported by two, spaced-apart support rods 7 that extend between the top bar 5 and the front rail 15.

Figure 6:
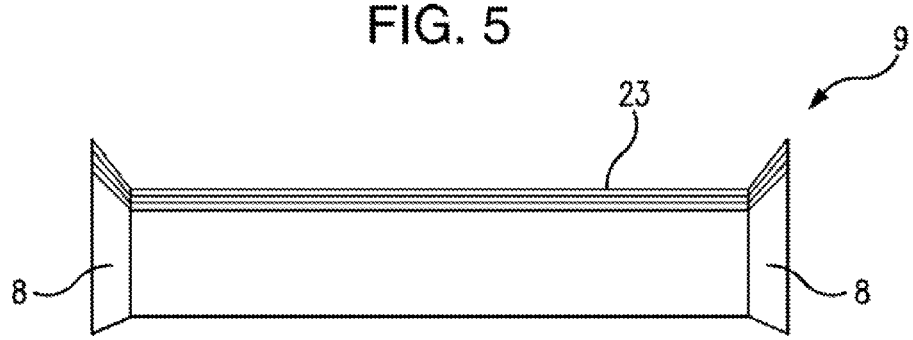
FIG. 6 is a full top view of the enclosure.
Figure 8:
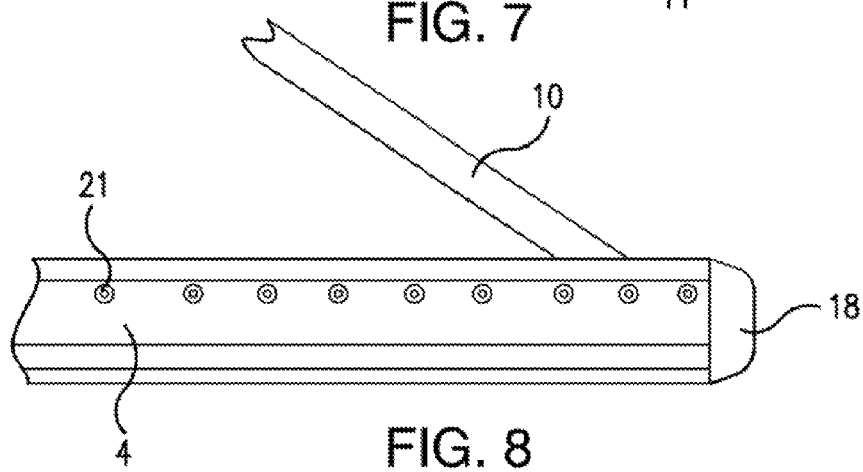
FIG. 8 is a portion of a lower side bar showing the snap fasteners.

FIG. 7 shows the support tubes 13 in place. FIG. 8 shows a portion of a side rail 4 showing the placement of snap fasteners and the back rail 11, showing the placement of the end piece 18, while FIG. 6 is a full top view of the top of the enclosure showing the panels 8 and the partially rolled open conduit 23, as well as the conduit along the trailing edge of the panel 8.

The fabric top is typically fastened at the trailing edges of the enclosure by fixing a cord in the leading edge of the fabric and placing it in a channel for securement wherein the channel is affixed to the enclosure trailing edges.

In addition, plastic c-channel locking pieces can be sewn into the fabric and an opposite channel can be fixed to the enclosure. It is also contemplated within the scope of this invention to provide snap fasteners for the trailing edges of the enclosure for this purpose.

The fabric cover 17 is similar to the well-known Tonneau covers that are found on the beds of pickup trucks except, in the instant invention, it is configured to fit the aerodynamic structure as shown herein. The fabric cover 17 of the instant invention can be manufactured from canvas or latex and butyl rubber fabrics. Certain of these fabrics can also contain vinyl, jute, rayon and acrylic fibers.

The frame of the devices of this invention can be bolted together, glued together, or welded together. The preferred method is welding as the frame is constituted almost entirely of metal.

The frame is attached to the top rail of the bed of a pickup truck by clamps, so that it can be readily removed.

What is claimed is:

1. Removable aerodynamic truck topper, said truck topper comprising a frame configured to surmount the top rails of a bed of a pickup truck, said frame comprising:
   a. a front rail having a first end and a second end;
   b. two, spaced-apart side rails, one each side rail fixedly attached to a first end of said front rail and said second end of said front rail;
   c. two, spaced-apart, elevated side rails, each said elevated side rail having a first end and a second end, each said elevated rail first end being fixedly attached to each said second end of said spaced-apart side rail, each said second end of said elevated side rail being fixedly attached to an enclosure;
   d. said enclosure comprised of (i) two spaced-apart panels, said panels being attached to each other by (ii) an extended top bar, (iii) a top having a back edge, there being a partially rolled open conduit attached to said back edge of said top, each said enclosure having a back panel and a side panel, each said side panel having a partially rolled open conduit attached to a back edge thereof, wherein a bottom edge of each side panel is fixedly attached to each said side rail, there being two, spaced-apart support rods extending between said top bar and said front rail;
   e. a removable back bar having two ends, said back bar containing an insertable block at each said end thereof;
   f. at least two support tubes that have open ends, said support tubes extending from said top bar to said back bar, said support tubes being removable;
   g. each said side rail, said top bar, and said back rail having a plurality of first snap fasteners on an outside surface;
   h. said frame being covered with a fabric cover, said fabric cover having a plurality of second snap fasteners, said second snap fasteners aligning with said first snap fasteners.

2. Removable aerodynamic truck topper as claimed in claim 1 wherein, in addition, said front of said frame is covered with a cover.

3. Removable aerodynamic truck topper as claimed in claim 2 wherein said cover is manufactured from plastic.

4. Removable aerodynamic truck topper as claimed in claim 2 wherein said cover is manufactured from glass.

* * * * *